US007133897B1

(12) United States Patent  
Tran

(10) Patent No.: US 7,133,897 B1  
(45) Date of Patent: Nov. 7, 2006

(54) METHOD TO IMPORT/EXPORT OR DETACH/ATTACH A FILE TO/FROM A REMOTE MAIL SERVER

(75) Inventor: Trung Minh Tran, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 479 days.

(21) Appl. No.: 09/442,693

(22) Filed: Nov. 18, 1999

(51) Int. Cl.
*G06F 15/16* (2006.01)

(52) U.S. Cl. ............... 709/206; 709/219; 709/224; 713/169

(58) Field of Classification Search ........... 709/203, 709/206, 218, 222, 224, 232, 227, 228, 220, 709/219; 710/10; 713/169, 170
See application file for complete search history.

(56) References Cited

U.S. PATENT DOCUMENTS

| | | | | |
|---|---|---|---|---|
| 5,632,018 A * | 5/1997 | Otorii ..................... | 709/200 |
| 5,732,219 A | 3/1998 | Blumer et al. ............ | 709/226 |
| 5,752,059 A | 5/1998 | Holleran et al. | |
| 5,765,170 A | 6/1998 | Morikawa | |
| 5,771,355 A | 6/1998 | Kuzma ..................... | 709/228 |
| 5,781,901 A | 7/1998 | Kuzma | |
| 5,793,966 A * | 8/1998 | Amstein et al. ........... | 709/203 |
| 5,813,008 A | 9/1998 | Benson et al. | |
| 5,958,007 A * | 9/1999 | Lee et al. .................. | 709/219 |
| 6,012,100 A * | 1/2000 | Frailong et al. ........... | 709/250 |
| 6,073,172 A * | 6/2000 | Frailong et al. ........... | 709/222 |
| 6,092,198 A | 7/2000 | Lanzy et al. .............. | 713/201 |
| 6,125,388 A * | 9/2000 | Reisman ................... | 709/218 |
| 6,275,850 B1 * | 8/2001 | Beyda et al. .............. | 709/206 |

* cited by examiner

*Primary Examiner*—Khanh Quang Dinh
(74) *Attorney, Agent, or Firm*—Joseph R. Burwell; Leslie Van Leeuwen

(57) ABSTRACT

A computer-implemented method for importing/attaching or exporting/detaching a file during a given e-mail operation. From a user's perspective, the method begins when the user elects to perform the import/attach or export/detach function with respect to a given file. If the file resides locally, the operation proceeds as usual by carrying out the function as if the file is on the local system and resides in a known place. If, however, the file does not reside locally, a panel or other user interface is displayed. Using this panel, the user may then attempt to log into a remote system on which the file is supported. Thus, for example, the user interface may require the user to enter a userid, password, hostname, or some combination thereof. If the user login is successful, the routine gets or puts the file (e.g., using an FTP operation) as required, preferably as a background process. Upon completion of the file transfer, the routine then automatically completes the import/attach or export/detach function as if the file is on the local system and resides in the known location.

27 Claims, 2 Drawing Sheets

METHOD TO IMPORT/EXPORT OR DETACH/ATTACH A FILE TO/FROM A REMOTE MAIL SERVER

BACKGROUND OF THE INVENTION

1. Technical Field

This invention relates generally to information delivery in a computer network. More particularly, the invention relates to a method for importing/exporting or detaching/attaching a file to or from a remote host or mail server in a distributed computer environment.

2. Description of the Related Art

E-mail has become the communication method of choice throughout the business world as well as for the general public. In a typical enterprise environment, a mail server (such as UNIX SendMail) has a local mail delivery agent or client (typically . . . /bin/mail on UNIX systems) that stores an incoming e-mail on a local file system and delivers it to an end user via POP, IMAP or a command line program. Such agents typically provide the basic functionality of logging in an e-mail message and copying that message to a client machine's mail spool. Internet-based client-server messaging systems include, for example, Lotus Notes, which provides e-mail, calendaring, group scheduling, Web access and information management, integrated in an easy-to-use and customizable environment.

Existing e-mail applications (such as a Lotus Notes client), UNIX sendmail or MS Internet Mail) do not allow a user to import ("attach") a file from a remote host or to export ("detach") a file to a remote host in the network. A "remote" host as used herein could be configured as either a client or a server. These functions, however, may only be performed for a file that resides on a local host. Thus, in the prior art, before a user may import a file, that file has to reside locally. If the file does not reside locally, the user must perform a file transfer (e.g., using a protocol such as ftp) to first retrieve the file from the remote server to the local system. Conversely, in the prior art, if the user desires to export a file received with a given e-mail, he or she must open the e-mail, detach the file, and then perform a separate file transfer (e.g., via ftp) from the local to the remote system.

It would be desirable to enable a user to remotely import/attach or export/detach a file residing in a remote host in an Internet-based e-mail client. The present invention addresses this deficiency in the art.

BRIEF SUMMARY OF THE INVENTION

It is an object of the present invention to provide an e-mail or other SMTP-based client with the ability to perform a given operation on a file that resides on a remote system in a distributed computer environment.

It is another more specific object of the invention to enable a given application that performs an import/attach or export/detach function to carry out that function on a remotely-hosted file.

Another more specific object of the present invention is to support a file import/attach or export/detach functionality for both local and remote systems within an Internet e-mail or SMTP client-server based application.

A further object of this invention is to enable a user of an e-mail client to perform a given function on a file irrespective of whether that file resides on a local or a remote system.

Still another object of this invention is to enable a client-based e-mail application with the capability of importing/attaching or exporting/detaching a remotely-supported file as if the file is resident on a local system at a given known location.

A more general object of the present invention is to provide an enhanced e-mail client that enables a user to perform given operations on files located on a remote mail server. The functionality of the present invention may be designed into an e-mail client or provided as an adjunct thereto.

These and other objects of the invention are achieved, for example, in a computer-implemented method for importing/attaching or exporting/detaching a file during a given e-mail operation. From a user's perspective, the method begins when the user elects to perform the import/attach or export/detach function with respect to a given file. By way of example, assume the user receives an e-mail that refers to a given file that the user then desires to open. If the file resides locally, the operation proceeds as usual by carrying out the function as if the file is on the local system and resides in a known place. If, however, the file does not reside locally, a panel or other user interface is displayed. Using this panel, the user may then attempt to log into a remote system on which the file is supported. Thus, for example, the user interface may require the user to enter a userid, password, hostname, or some combination thereof. If the user login is successful, the routine gets the file (e.g., using an FTP GET operation) in a background mode and places the file in a given location (e.g., a temporary directory) on the local machine. The application then automatically performs the import function as if the file is on the local system and resides in the known location (i.e. the temporary directory). In another example, the user may want to detach an attached file to a remote host or attach a file from a remote host. In this case, the attach or detach task from or to a remote host would be done automatically in background mode.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
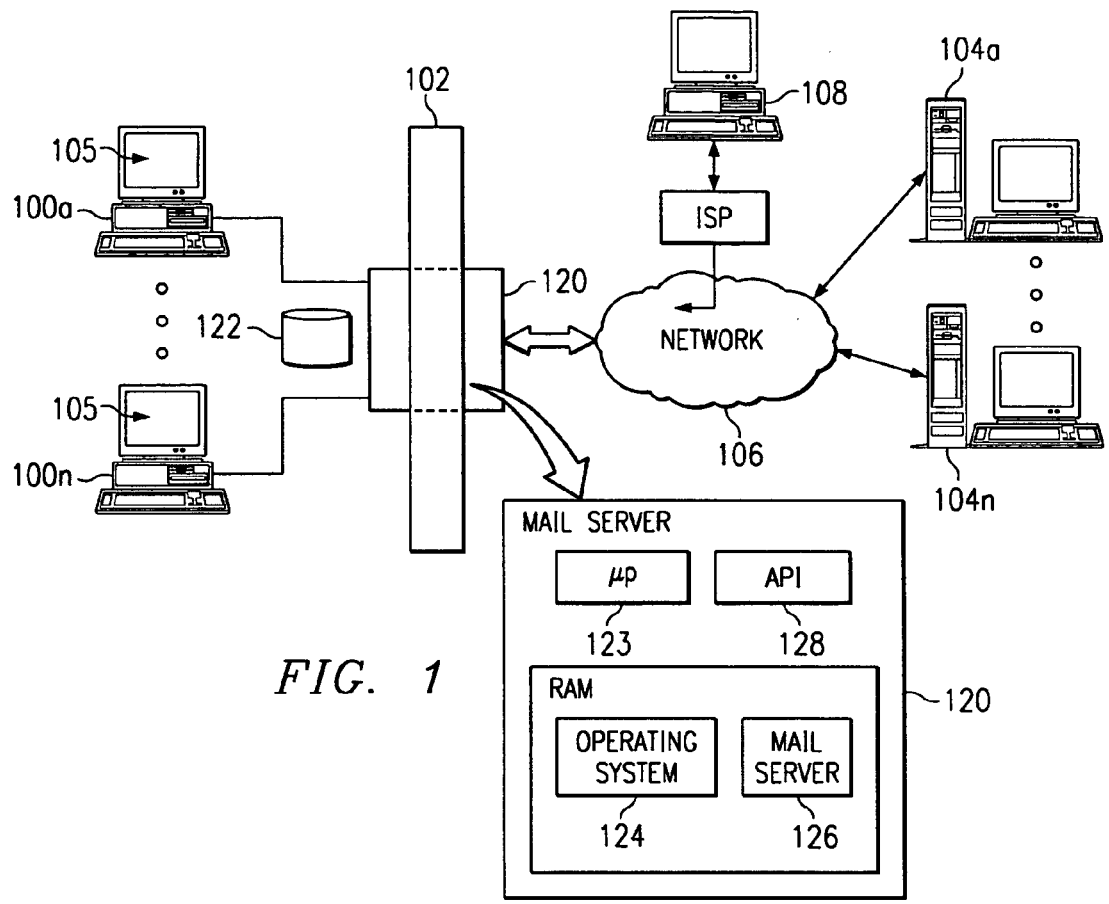
FIG. 1 is a representative SMTP-based client-server system in which the present invention is implemented.

A known Internet client-server system is implemented is and illustrated in FIG. 1. In this system, a set of client machines 100*a*–100*n* are connected behind a network firewall 102 within an enterprise environment. Each client machine has the capability of connecting to a set of web servers 104*a*–104*n* over network 106 in a known manner. Network 106 typically includes other servers for control of domain name resolution, routing and other control functions. The network 106 is the Internet, an Intranet, or any other known network. To this end, each client typically includes a suite of programs that enable a user of the client to obtain known Internet services including one-to-one messaging (e-mail), one-to-many messaging (bulletin board), file transfer, and web browsing. Thus, a user of client 108 outside the firewall 102 may communicate with one of the clients 100 inside the firewall. A representative client includes a Simple Mail Transport Protocol (SMTP) e-mail client 105 such as Lotus Notes, Microsoft Outlook, or the like. E-mail clients 105 cooperate with mail server 120 in a known manner. A representative mail server 120 includes a local mail delivery agent that stores incoming e-mail on a local file system 122 and delivers it to an end user (e.g., via POP, IMAP or a command line program). In the Internet paradigm, a network path to a resource (e.g., a server) is identified by a so-called Uniform Resource Locator (URL).

A representative mail server 120 is an IBM Domino server comprising a processor 123, an operating system 124 and a mail server program 126. Mail server program is a local mail delivery agent, as previously noted. The server 120 may include an Application Programming Interface (API) 128 that provides extensions to enable application developers to extend and/or customize the core functionality thereof through software programs including plug-ins, servlets, and the like.

A representative client is a personal computer, notebook computer, Internet appliance or pervasive computing device (e.g., a PDA or palm computer) that is x86-, Pentium-PowerPC®- or RISC-based. The client includes an operating system such as IBM® OS/2®, Microsoft Windows, Microsoft Windows NT, Windows CE or PalmOS. As noted above, the client includes a suite of Internet tools including a Web browser, such as Netscape Navigator or Microsoft Internet Explorer, that has a Java Virtual Machine (JVM) and support for application plug-ins or helper applications. The client also includes an e-mail client, such as Lotus Notes, Microsoft Outlook, or the like, to manage e-mail communications.

Figure 2:
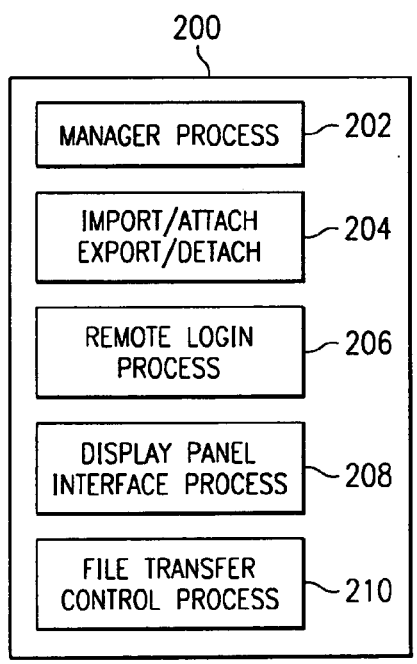
FIG. 2 is a block diagram of the basic operating processes of the e-mail client of the present invention.

Existing e-mail clients have the capability of performing file import (attach) or export (detach) functions. According to the present invention, these functions may be carried out regardless of whether a file to be imported/attached or exported/detached resides locally or on a remote system. FIG. 2 illustrates an e-mail client 200 that is provisioned to provide this functionality according to the present invention. E-mail client 200 comprises a manager process 202, a file import/attach and export/detach process 204, a remote login process 206, a display panel interface process 208, and a file transfer control process 210. One or more of these routines may be integrated into a composite control process, and these routines may be provisioned within an existing e-mail client or be supported as an adjunct thereto. The manager process 202 controls the overall operation of the e-mail application. The file import/attach and export/detach process 204 provides the conventional functionality of the prior art. The remote login process enables the user of the e-mail client to remotely access a file supported on a remote system during the import/attach or export/detach operation as will be seen. The display panel interface process 208 displays a set of display panels that are used to facilitate the remote login and identification of the file on the remote system. The file transfer control process 210 enables the remote operation on the file, typically through an ftp GET or PUT operation, as will seen. The file transfer control process 210 also manages the file on the local system, typically by placing the file in a given location such as a temporary directory. For example, in the AIX operating system, the file transfer control process stores the file in the /tmp directory. In Windows, the process stores the file in <drive>\temp directory.

Thus, in an illustrative embodiment, it is assumed that a user elects to perform an import/attach or export/detach function with respect to a given file. By way of example, assume the user receives an e-mail that refers to a given file that the user then desires to open. If the file resides locally, the operation proceeds as usual by carrying out the function as if the file is on the local system and resides in a known place. If, however, the file does not reside locally, the display panel interface process displays a panel or other user interface. Using this panel, and under the control of the remote login process, the user may then attempt to log into a remote system on which the file is supported. Thus, for example, the user interface may require the user to enter a userid, password, hostname, or some combination thereof. If the user login is successful, the file transfer control process gets the file (e.g., using an FTP GET operation) in a background mode and places the file in a given location (e.g., the temporary directory) on the local machine. The manager process then automatically performs the import function as if the file is on the local system and resides in the known location (i.e. the temporary directory). A similar functionality is carried out for an export/detach function.

The present invention will now be described in more detail and illustrated in the context of an Internet e-mail client. This preferred operating environment, however, is not a limitation of the invention. In particular, the inventive functionality may be implemented within any application that performs an import/attach and/or export/detach type of functionality with respect to a given resource. In the illustrative embodiment, the inventive routine is implemented as a Java application, an applet, native code, or code implemented within an existing application. Thus, preferably each of the processes described above and illustrated in FIG. 2 is a set of instructions that together comprise a computer program. This program is executable in a processor running a given operating system.

Figure 4:
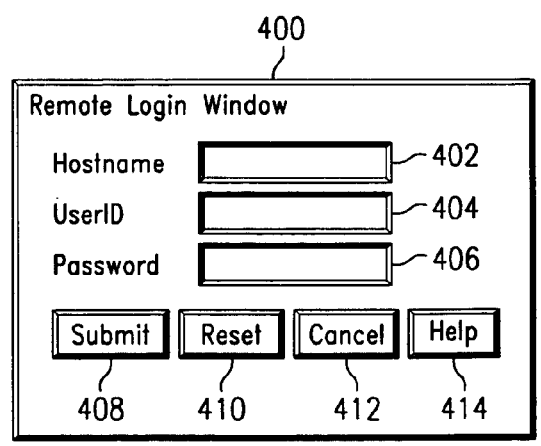
FIG. 4 is an illustrative graphical user interface (GUI) dialog for use in enabling a user to perform a remote login according to the present invention.
Figure 3:
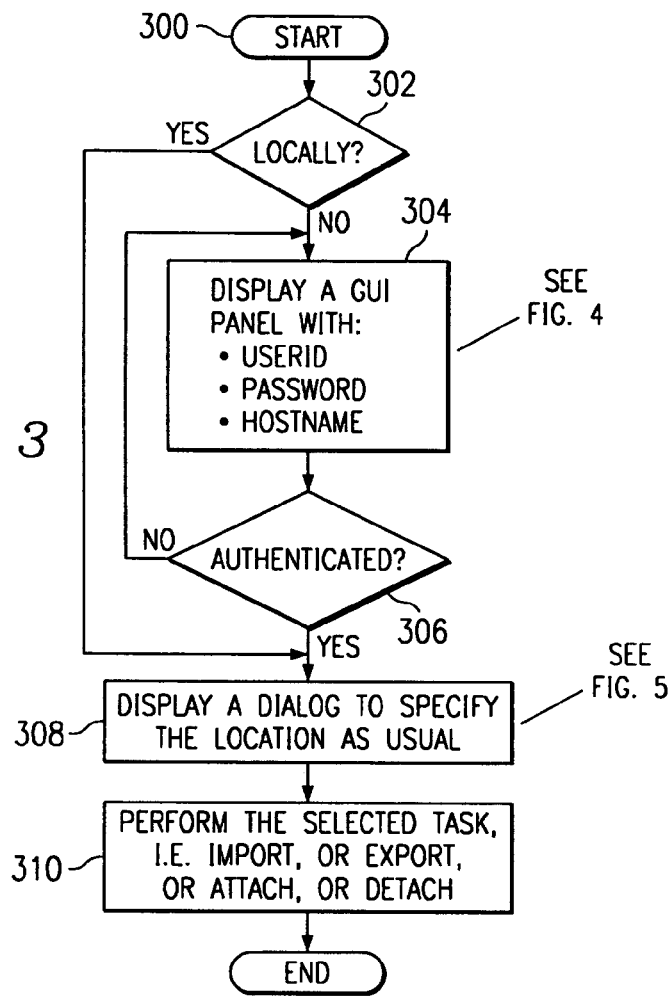
FIG. 3 is a flowchart illustrating a preferred operation of the inventive method.

FIG. 3 is a flowchart illustrating the operation of the invention as provided by the processes illustrated in FIG. 2. The routine begins at step 300. At step 302, a test is performed to determine if the file on which the given import/attach or export/detach function is to be performed resides locally. If the outcome of the test at step 302 is negative, the routine continues at step 304 to display a panel 400 such as illustrated in FIG. 4. The display panel 400 enables the user to perform a remote login, e.g., by entering a hostname 402, userid 404 and password 406 (or some given combination thereof) and then selecting Submit 408.

The user may reset the fields by selecting Reset 410. The dialog is cancelled if the user selects Cancel 412. A Help button 414 may be used to call up a help dialog.

Figure 5:
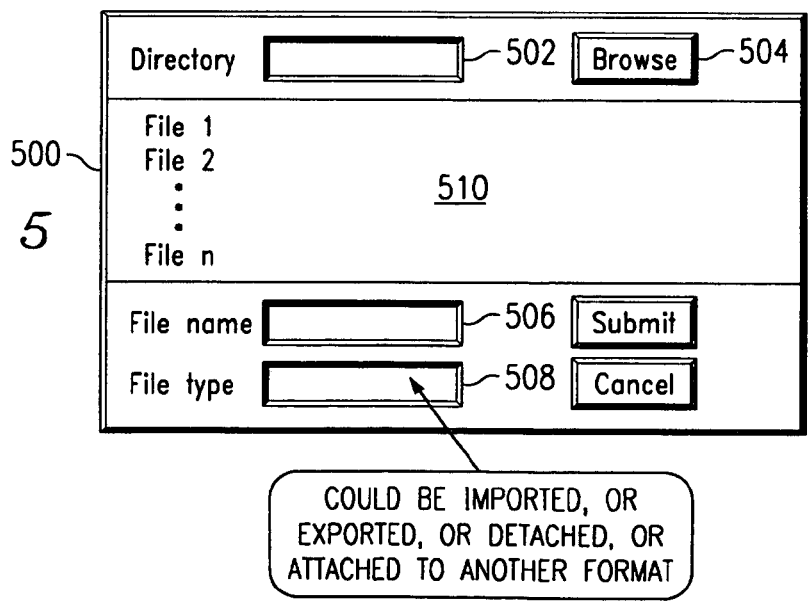
FIG. 5 is a GUI panel for use in identifying a given file to import/attach or export/detach according to the present invention.

Returning back to FIG. 3, following the login attempt, a test is performed at step 306 to determine whether the user has been authenticated successfully at the remote server. If the outcome of the test at step 306 indicates that the login was not successful, the routine returns to step 304 to redisplay the display panel, perhaps with an appropriate error message. If, however, the user has been properly authenticated, the routine branches to step 308 to display a dialog to enable the user to specify a location of the file upon which the import/attach or export/detach will be processed. Step 308 is also reached upon a positive outcome of the test at step 302. FIG. 5 illustrates a representative user dialog panel 500 for enabling a user to take a given action with respect to the file. In particular, panel 500 includes a Directory field 502 and a Browse button 504, together with appropriate fields 506 and 508 for entry of a file name and file type, respectively. The display also includes a file listing 510. Returning to FIG. 3, following display of the panel, the routine continues at step 310 to perform the selected task, namely, import/attach or export/detach. This completes the processing.

Thus, according to the invention, the user of the e-mail client may import/attach or export/detach a given file regardless of where the file resides. As illustrated above, preferably the functionality is initiated when the user selects (e.g., via a mouse or keyboard input) one of the described functions. Alternatively, the inventive functionality is implemented from a user menu. Thus, for example, when the user selects the desired import/export function, a menu is displayed requesting the user to make a choice identifying the local or remote system. If the LOCAL system option is selection, conventional import/attach or export/detach functionality takes place. If, however, the user selects the REMOTE option, a remote login panel is displayed containing the following fields: the hostname where the file resides, a userid, and a password for logging into the remote host. If desired, the dialog may also include appropriate fields to enable the user to enter a fully-qualified path and name of the desired file. In the above-described embodiment, this information was not requested until after the user login has been tried and succeeds. Thus, in this alternative embodiment, the user login and file description takes place (perhaps using the same display panel) prior to the remote login attempt. After the user has filled-in the above fields and takes a given control action, hits <ENTER>, the routine verifies the user login and, if the user is authenticated, performs an ftp GET or PUT function in a background mode. The ftp GET or PUT function should be automatically set to the right mode when transferring the file. For examples, an ASCII mode preferably is used when transferring a text file, whereas a BINARY mode preferably is used for transferring a binary file. The desired file is then placed in a given location, e.g., a temporary directory. The application may then optionally perform a verification on the desired file. Thus, in an illustrative embodiment, the routine checks for an ftp return code and the existence of the desired file to insure that the ftp operation was carried out successfully. If the file transfer did not occur properly, an error message may be provided. If the file transfer occurred without error, the application then automatically performs the import/attach or export/detach function as if the file is on the local system and resides in a known-place. This completes the processing.

As described above, the inventive functionality may be used within any application from which it is desired to import/attach or export/detach an object to/from a remote machine. Thus, in an alternate embodiment, a user may perform such an operation from a web browser that is provisioned to perform the inventive functionality. In this application of the invention, the user of the web browser may carry out the import/export function, for example, on an HTML file, an image displayed in a page, an executing script, an audio file, a video file, or the like. The steps for performing the task include saving the object to a temporary location, and the using the ftp://<remote host>/ operation to perform the action as has been previously described.

In the preferred embodiment, a file transfer operation uses the file transfer protocol. This is not a limitation of the invention either. Any suitable transfer protocol, e.g., HTTP or the like, may be used for this purpose.

As noted above, the above-described functionality preferably is implemented in software executable in a processor, namely, as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, as used herein, a Web "client" should be broadly construed to mean any computer or component thereof directly or indirectly connected or connectable in any known or later-developed manner to a computer network, such as the Internet. The term Web "server" should also be broadly construed to mean a computer, computer platform, an adjunct to a computer or platform, or any component thereof. Of course, a "client" should be broadly construed to mean one who requests or gets the file, and "server" is the entity which downloads the file.

Having thus described my invention, what I claim as new and desire to secure by Letters Patent is set forth in the following claims.

What is claimed is:

1. A method operative on a local machine, comprising the steps of:
   in response to a request to perform an e-mail operation, determining whether the e-mail operation is to be performed with respect to a remote server or with respect to the local machine, wherein the e-mail operation is initiated by a user of the local machine, and wherein the e-mail operation is an import/attach operation or an export/detach operation;
   in response to a determination that the e-mail operation is to be performed with respect to a remote server:
      displaying a dialog to enable a user to perform a login to the remote server;
      after authentication of the user, performing a file transfer operation between the remote server and the local machine with respect to a user-specified file; and
      after authentication of the user, executing the e-mail operation with respect to the user-specified file.

2. The method as described in claim 1 wherein the request is for an import/attach operation.

3. The method as described in claim 2 wherein the file transfer operation retrieves the user-specified file from the remote server.

4. The method as described in claim 3 further including the step of saving the user-specified file to a local directory prior to executing the import/attach operation.

5. The method as described in claim 4 further including the step of verifying the file transfer operation prior to executing the import/attach operation.

6. The method as described in claim 1 wherein the request is for an export/detach operation.

7. The method as described in claim 6 wherein the file transfer operation transfers the user-specified file to the remote server.

8. The method as described in claim 7 further including the step of verifying the file transfer operation prior to executing the export/detach operation.

9. The method as described in claim 1 wherein the authentication step takes place on the remote server.

10. A method operative on a local machine having an e-mail client, comprising the steps of:
 in response to a request to perform an e-mail operation, determining whether the e-mail operation is to be performed with respect to a remote server or with respect to the local machine, wherein the e-mail operation is initiated by a user of the local machine, and wherein the e-mail operation is an import/attach operation or an export/detach operation;
 in response to a determination that the e-mail operation is to be performed with respect to a remote server:
  displaying a dialog to enable a user to perform a login to the remote server;
  after authentication of the user, displaying a dialog to identify a user-specified file;
  after identifying the user-specified file, performing a file transfer operation between the remote server and the local machine with respect to the user-specified file; and
  after identifying the user-specified file, executing the e-mail operation with respect to the user-specified file.

11. The method as described in claim 10 wherein the e-mail operation is an import/attach operation, and wherein the file transfer operation retrieves the user-specified file from the remote server prior to executing the e-mail operation.

12. The method as described in claim 10 wherein the e-mail operation is an export/detach operation, and wherein the file transfer operation transfers the user-specified file to the remote server after executing the e-mail operation.

13. The method as described in claim 10 wherein the file transfer operation is performed via a given protocol.

14. The method as described in claim 13 wherein the given protocol is FTP (File Transfer Protocol).

15. The method as described in claim 10 further including a step of saving the user-specified file to a local directory prior to executing the e-mail import/attach or export/detach operation.

16. A computer program product in a computer useable medium for use in a client, comprising:
 means responsive to a request to perform an e-mail operation for determining whether the e-mail operation is to be performed with respect to a remote server or with respect to the local machine, wherein the e-mail operation is initiated by a user of the local machine, and wherein the e-mail operation is an import/attach operation or an export/detach operation;
 means responsive to a determination that the e-mail operation is to be performed with respect to a remote server for displaying a dialog to enable a user to perform a login to the remote server;
 means for performing a file transfer operation between the remote server and the local machine with respect to a user-specified file after authentication of the user; and
 means for executing the e-mail operation with respect to the user-specified file after authentication of the user.

17. The computer program product as described in claim 16 wherein the e-mail operation is an import/attach operation, and wherein the means for performing the file transfer operation retrieves the user-specified file from the remote server prior to executing the e-mail operation.

18. The computer program product as described in claim 16 wherein the e-mail operation is an export/detach operation, and wherein the means for performing the file transfer operation transfers the user-specified file to the remote server after executing the e-mail operation.

19. The computer program product as described in claim 16 wherein the file transfer operation is performed using a file transfer protocol.

20. The computer program product as described in claim 19 wherein the file transfer protocol is FTP (File Transfer Protocol).

21. The computer program product as described in claim 16 further including means for verifying the file transfer operation.

22. The computer program product as described in claim 16 further comprising means for receiving a userid, a password, and a hostname in the displayed dialog.

23. The computer program product as described in claim 16 further comprising means for displaying a dialog to identify a user-specified file.

24. A computer program product in a computer useable medium for use in a computer, comprising:
 means responsive to a request to perform an e-mail operation for determining whether the e-mail operation is to be performed with respect to a remote server or with respect to the local machine, wherein the e-mail operation is initiated by a user of the local machine, and wherein the e-mail operation is an import/attach operation or an export/detach operation;
 means responsive to a determination that the e-mail operation is to be performed with respect to a remote server for displaying a dialog to enable a user to perform a login to the remote server;
 means for displaying a dialog to identify a user-specified file after authentication of the user;
 means for performing a file transfer operation between the remote server and the local machine with respect to the user-specified file after identifying the user-specified file; and
 means for executing the e-mail operation with respect to the user-specified file after identifying the user-specified file.

25. A computer system, comprising:
 a processor;
 an e-mail client;
 means responsive to a request to perform an e-mail operation for determining whether the e-mail operation is to be performed with respect to a remote server or with respect to the local machine, wherein the e-mail operation is initiated by a user of the local machine, and wherein the e-mail operation is an import/attach operation or an export/detach operation;

means responsive to a determination that the e-mail operation is to be performed with respect to a remote server for displaying a dialog to enable a user to perform a login to the remote server;

means for performing a file transfer operation between the remote server and the local machine with respect to a user-specified file after authentication of the user; and means for executing the e-mail operation with respect to the user-specified file after authentication of the user.

26. The computer as described in claim 25 wherein the e-mail operation is an import/attach operation, and wherein the means for performing the file transfer operation retrieves the user-specified file from the remote server prior to executing the e-mail operation.

27. The computer as described in claim 25 wherein the e-mail operation is an export/detach operation, and wherein the means for performing the file transfer operation transfers the user-specified file to the remote server after executing the e-mail operation.

* * * * *